INVENTOR.
CRAIG R. ANDERSSON
BY Donald R. Johnson
ATTORNEY though ONE of the most useful for the present invention is isopropanol alcohol which, as mentioned above, is a preferred feed.

United States Patent Office 3,529,018
Patented Sept. 15, 1970

3,529,018
PROCESS FOR CONTINUOUSLY AND SIMULTANEOUSLY DRYING AND LIBERATING ORGANIC ACIDS FROM THEIR METAL SALTS
Craig R. Andersson, Chester, Pa., assignor to Sun Oil Company, Philadelphia, Pa., a corporation of New Jersey
Filed Feb. 24, 1966, Ser. No. 529,812
Int. Cl. C07c 63/38
U.S. Cl. 260—515                                1 Claim

ABSTRACT OF THE DISCLOSURE

A method for obtaining dry naphthalene 2,6-dicarboxylic acid from aqueous solution of its alkali or alkaline earth metal salts which comprises spraying said aqueous solution of the carboxylic acid salt and simultaneously contacting the sprayed salt with a flow of hot acidic gas.

---

Figure 1:
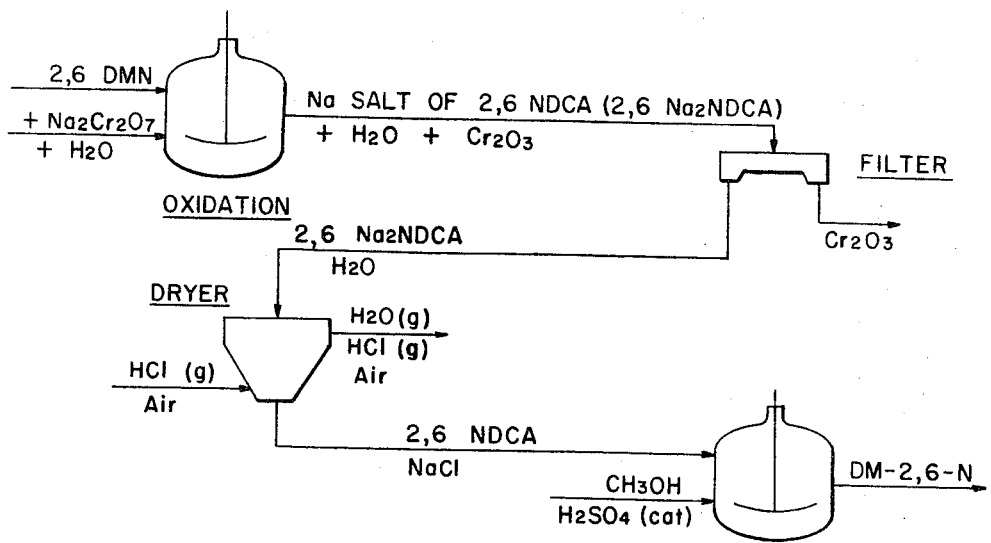

This invention relates to processes for continuously liberating organic acids from their alkali and alkaline earth metal salts. More specifically, this invention relates to an improvement in such processes whereby acidification for the purpose of liberating the acids is carried out by spray drying.

Although the process of this invention may be applied generally for converting alkali and alkaline earth metal salts of carboxylic acids, it is most useful as a method for preparing 2,6-naphthalene dicarboxylic acid and its esters. Naphthalene dicarboxylic acid in which the carboxyl groups are located at the 2,6-positions is a highly desirable article of commerce, particularly in that it can be used for making polyester type resins which have outstanding good properties for certain applications. This dicarboxylic acid can be obtained by liquid phase oxidation of 2,6-dimethylnaphthalene in several ways. One known procedure involves dichromate oxidation wherein the 2,6-dimethylnaphthalene is oxidized by sodium dichromate producing the sodium salt of 2,6-naphthalene dicarboxylic acid which is then filtered. Free 2,6-naphthalene dicarboxylic acid may then be obtained from the alkali metal salt by acidfying an aqueous solution of the resulting crude reaction product.

Another method of preparing 2,6-dicarboxylic acid starts with a mixture of dimethylnaphthalene, not necessarily all 2,6 isomers. For example, a mixture of dimethylnaphthalenes, obtained from cracked petroleum fractions or coal tar, can be oxidized in accordance with the method mentioned above (or otherwise, e.g. by selenium-$NO_2$ oxidation) to yield an impure mixture of the corresponding dicarboxylic acid isomers in which the 2,6-diacid is present typically in a concentration of only about 10%. The dipotassium or dicesium salts of this mixture can then be converted to the 2,6-dicarboxylate by the Henkel reaction. This procedure involves heating the naphthalene dicarboxylate to a temperature in the range of 350° to 530° C. in the presence of a catalyst which is a salt or oxide of cadmium, zinc or mercury and in a carbon dioxide atmosphere at a pressure of 50–750 p.s.i.g. This causes a shift in position of the carboxylate groups to the 2,6-positions. The rearrangement occurs regardless of whether the two carboxylate groups in the starting material are located on the same ring or on different rings of the naphthalene nucleus. The resulting potassium or cesium 2,6-naphthalene dicarboxylates can be acidified to recover the free 2,6-dicarboxylic acid.

The acid recovered in any of these processes can be converted to an appropriate ester, i.e. dimethyl, diethyl, etc. However, before esterification, the acid must be liberated from its alkali metal salt. Furthermore, the acid charge in esterification must be dry since esterification is an equilibrium reaction in which water is produced as a product. Therefore, any water present in the feed will tend to suppress the reaction thereby reducing the yield of ester.

Heretofore the recovery of dry acid, particularly 2,6-naphthalene dicarboxylic acid, from its alkali or alkaline earth metal salt has presented a problem. Acidification of an aqueous solution of the salts results in the formation of a voluminous, gelatinous mass which tenaciously retains water and thereby seriously extends the time required to dry the acids. Drying times of 24 hours or longer have not been uncommon in laboratory vacuum ovens. It has been found that this difficulty can be eliminated by spray drying the carboxylic acid salt with a flow of hot acidic gas. This process comprises spraying a solution of the carboxylic acid salt and contacting the sprayed salt with a flow of hot acidic gas. By this method the acid salts are rapidly and continuously processed for subsequent esterification.

According to this invention, alkali or alkaline earth metal salt is dissolved in water alcohol or any other suitable solvent and the solution sprayed into a mist and contacted with a countercurrent or concurrent flow of hot acidic gas. This may be accomplished by feeding the solution into the top of a spray dryer, such as, for example, a standard Bowen laboratory sprayer, and through the spray head, which converts the salt solution into a mist. The spray or mist of salt then falls down through the column while being subjected to a countercurrent flow of a hot gaseous liberating acid which is fed into the column from its bottom. The acid may be combined with an inert gas, such as air, or if the acid enters the column from its side or flows concurrently to the flow of solution, the inert gas may be fed from the bottom of the column upwardly. The rate of feed of gas into the bottom of the column, whether it be the hot acid, the inert gas or a mixture, controls the rate of fall of the alkali salt. Dry salt and organic acid are recovered at the bottom of the column.

A liberating acid for the purpose of this invention is any acid which is known in the art to liberate organic acid from its salt. HCl is the preferred liberating acid, but many others are suitable, e.g. nitric, sulfuric, $CO_2$, etc. and the particular acid used is not critical to this invention.

Another embodiment of simultaneous drying and liberating carboxylic acids from their alkali and alkaline earth metal salts comprises spraying a solution of the carboxylic acid salt together with the liberating acid into the top of the sprayer apparatus and contacting the sprayed solution and acid with the flow of hot inert drying gas. This embodiment is particularly suitable when the liberating acid is a liquid at the treatment temperature, since it assures intimate admixture of the salt with the acid. Also when the acid is a liquid it may be separately sprayer into the dryer chamber, for example, through nozzles arranged vertically along a column.

The spraying may be conducted in any standard atomizing apparatus or the like or in any apparatus which will form a spray from a liquid. The acid salt solution is fed at the top of the apparatus at a temperature normally ranging from about 100° to 450° C. This range is preferably 200° to 350° C. but will vary according to the particular acid salt which is being spray-dried. The rate of feed varies according to the particular apparatus employed. In a small Bowen spray dryer, the rate of feed may vary from 50 to 400 cc. per minute, preferably 90 to 280 cc. per minute, with a solution containing about 18 grams of salt per 100 cc. The rate of feed and solution concentration also varies according to the particular acid which is treated and the particular apparatus used. Rates of feed and solution concentrations outside of the values given above may be used in other spraying apparatuses with good results, and, within the range of operability, the particular rate used with a given dryer is not critical.

Figure 2:
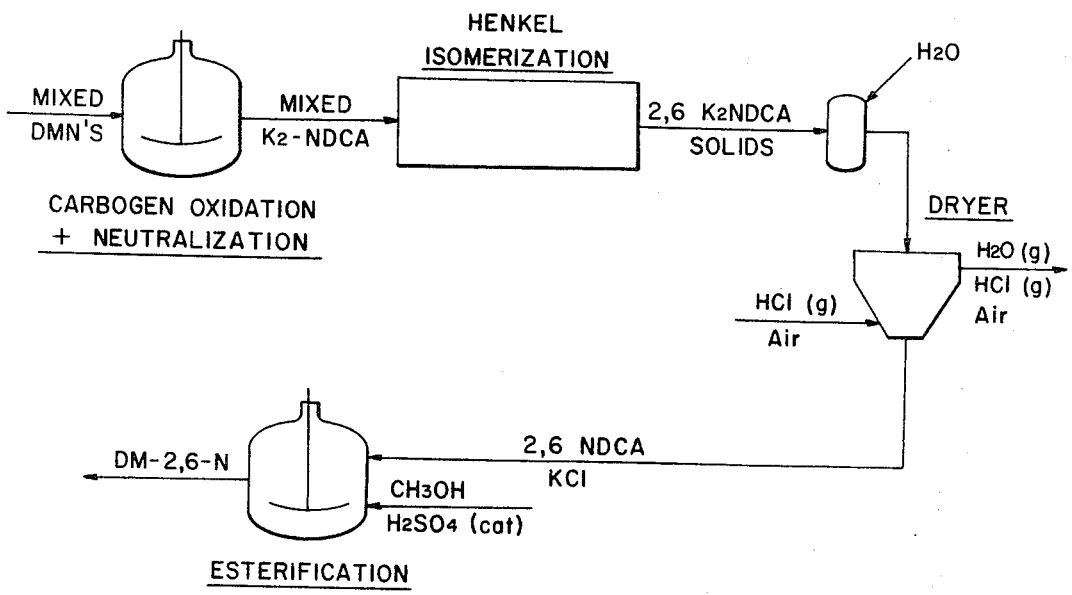

This proposal provides for rapid, continuous processing of acid salts which would not otherwise be possible due to the long drying times required. The drawing is a schematic illustration of two embodiments of the present invention. FIG. 1 shows a process utilizing dichromate oxidation and FIG. 2 shows a Henkel isomerization process. FIG. 1 shows the oxidation of 2,6-dimethylnaphthalene with sodium dichromate, subsequent filtering of the sodium salt of 2,6-naphthalene dicarboxylic acid, acidification by spray drying and recovery or subsequent esterification.

FIG. 2 describes the improvement as applied in a Henkel isomerization in which a mixture of dimethylnaphthalenes are oxidized and neutralized to mixed potassium salts of naphthalene dicarboxylic acids. The acids are subjected to isomerization by heating under pressure in the presence of cadmium chloride and then dissolved in water. The resulting 2,6-dipotassium salt is then subjected to the simultaneous drying and liberation step of the present invention. The dry acid recovered in this step may then be directly esterified without any further treatment.

Although described with reference to the making of 2,6-naphthalene dicarboxylic acid and its esters, the present process is not limited to this acid but has applicability to any organic carboxylic acid which can be liberated from its salt by acidification. The spray drying method is advantageous for processing any acid as long as it has a boiling point above that of its solvent. For example, the salts of the following acids could be used in this method: propionic, butyric, valeric, benzoic, chlorobenzoic, nitrobenzoic, phthalic, salicyclic, hydroxybenzoic, anthranilic, oxalic, malonic, succinic, maleic, fumaric, diphenic, anthracene 1-carboxylic, anthracene 2-carboxylic, naphthalene 1,4-dicarboxylic, naphthoic.

The invention is further illustrated by the following example:

A concentrate of dimethylnaphthalenes, which is obtained by azeotropic distillation of a catalytically cracked gas oil fraction with diethylene glycol, is used to prepare a crude mixture of naphthalene dicarboxylic acids by parital oxidation. The concentrate contains about 94% of $C_{12}$ alkylnaphthalenes having approximately the following composition as determined by vapor phase chromatography:

|  | Percent |
|---|---|
| 1-ethyl naphthalene | 1 |
| 2-ethyl naphthalene | 3 |
| 2,6-dimethyl naphthalene (DMN) | 18 |
| 2,7-DMN | 13 |
| 1,6-DMN | 22 |
| 1,7-DMN | 9 |
| 1,3-DMN | 25 |
| 2,3-DMN | 4 |
| 1,4-DMN | 2 |
| 1,5-DMN | 2 |
| 1,2-DMN | 1 |

This material is converted to a mixture of the crude diacids by contacting a 15 weight percent solution of the mixture in dichloro benzene in the presence of 5 weight percent selenium and excess nitrogen dioxide at a temperature of about 150° C. for a time of three hours.

A sample of the impure diacids (52 gms.) is extracted with 1000 ml. of methanol and subsequently converted to the dipotassium salts by the use of potassium hydroxide. The extract obtained amounts to 10 grams. The dipotassium salts (3 gms.) are then subjected to the Henkel reaction by heating at 410° C. for two hours in the presence of 10 mole percent of cadmium chloride and under $CO_2$ pressure of 750 p.s.i.g. The reaction mixture is extracted with ethyl ether to remove naphthalene and any other ether-soluble by-products. The salts, which are insoluble in ether, are collected. This procedure is repeated until a large amount of salt is recovered. The salt is then dissolved in water in a concentration of about 18 grams per 100 cc. The solution is then fed, at a rate of 100 cc. per minute and under a pressure of 100 p.s.i.g., into a Bowen standard laboratory scale spray dryer with two-fluid co-current nozzles. A stream of air and HCl (2.5:1 HCl to air by volume) is fed into the bottom of the dryer at a rate of 65 standard cubic feet of gas per minute and at a temperature of 325° C. The salt converts and dries readily and the free acid is recovered. The HCl which is mixed with the freed organic acid presents no problem in the subsequent esterification and therefore is not separated from the dry acid. The acid is then washed with methanol. Dry 2,6-naphthalene dicarboxylic acid is obtained from this process in good yields and in a dry form which can be subsequently used in esterification without requiring further treatment.

The foregoing example illustrates the improvement according to this invention with regard to simultaneous drying and liberation of an acid from its alkali or alkaline earth metal salt. This improvement is applicable in any method of preparing acids which requires the acid to be recovered from its salt for subsequent use. The example drawn to the preparation of 2,6-naphthalene dicarboxylic acid is merely illustrative of the invention and is not meant to be a limit on its scope.

What is claimed is:
1. A method for obtaining dry naphthalene 2,6-dicarboxylic acid from aqueous solution of its alkali or alkaline earth metal salts which comprises spraying said aqueous solution of the carboxylic acid salt and simultaneously contacting the sprayed salt with a flow of hot acidic gas.

References Cited

UNITED STATES PATENTS

| 3,209,024 | 9/1965 | McNelis et al. | 260—515 |
| 3,043,846 | 7/1962 | Blaser et al. | 260—515 |
| 3,156,695 | 11/1964 | Stein et al. | 260—515 |

FOREIGN PATENTS 1,142,597  1/1963  Germany.

OTHER REFERENCES

Lasser-Cohn: Manual of Organic Chemistry, MacMillan, London (1896), p. 336.

LORRAINE A. WEINBERGER, Primary Examiner

E. J. SKELLY, Assistant Examiner

U.S. Cl. X.R.

260—376, 469, 471, 473, 474, 475, 476, 485, 488, 518, 521, 525, 537, 538, 540